No. 840,286. PATENTED JAN. 1, 1907.
C. D. BALLARD.
VALVE.
APPLICATION FILED AUG. 16, 1906.
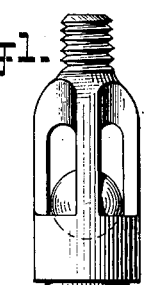
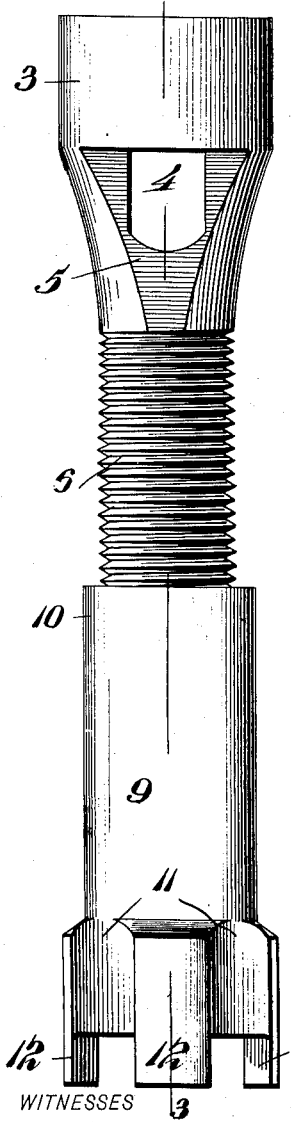
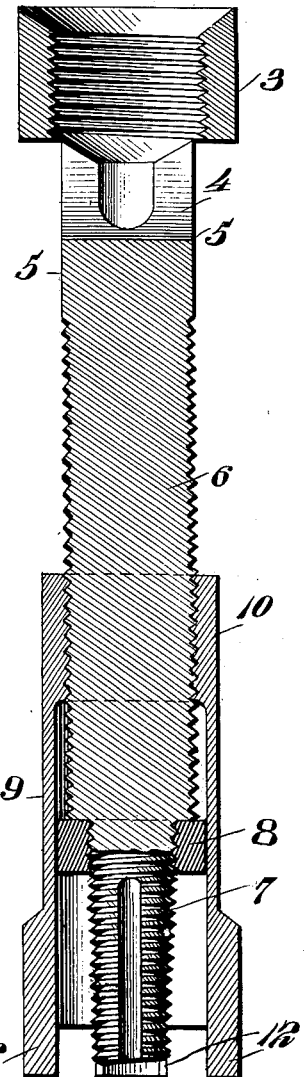
WITNESSES
H. G. Dieterich
J. W. Holt
INVENTOR
Clarence D. Ballard
BY Munn & Co
ATTORNEYS

UNITED STATES PATENT OFFICE.

CLARENCE DELBERT BALLARD, OF ELGIN, OHIO.

VALVE.

No. 840,286.        Specification of Letters Patent.        Patented Jan. 1, 1907.

Application filed August 16, 1906. Serial No. 330,820.

*To all whom it may concern:*

Be it known that I, CLARENCE DELBERT BALLARD, a citizen of the United States, and a resident of Elgin, in the county of Van Wert and State of Ohio, have invented a new and Improved Valve, of which the following is a full, clear, and exact description.

This invention relates to new and useful improvements in valves, more especially directed to valves as used in oil-wells, although the invention is not limited to such, as the adaptation of the improvements to valves in other connections will be apparent from the annexed description.

The barrel or cylinder of oil-wells usually contains two valves. The bottom or "standing" valve, as it is termed, is stationary and coacts with an upper reciprocating valve in raising the oil through the well-tube to the surface of the ground. It is often necessary to remove these valves to renew the leathers, &c., which is ordinarily accomplished by drawing out the upper reciprocating valve by the rods connecting it and replacing the valve with a tap adapted to screw on the lower extremity of the bottom rod, after which the rods are lowered and turned until the tap and standing valve are securely threaded together, when it may be drawn from the well. These operations require considerable time and delay, as well as work, which it is the object of this invention to overcome.

Reference is to be had to the accompanying drawings, forming a part of this specification, in which similar characters of reference indicate corresponding parts in all the figures.

Figure 1 is an elevational view of the standing and reciprocating valves of a well, disclosing the nature of my improvements, the valves being connected together for withdrawing the standing valve from or replacing it in the pump-barrel. Fig. 2 is an enlarged elevational view of the intermediate mechanism shown in Fig. 1, and Fig. 3 is a central vertical section of the same on the line 3 3 of Fig. 2.

Referring to the drawings, the numeral 1 indicates the upper or reciprocating valve of an oil or other well, the valve being of the usual or other preferred construction.

2 is the bottom or standing valve of the usual construction, which coacts with the valve 1 in raising the oil through the oil-tube to the surface of the ground.

Forming a permanent part of the valve 1 and removably connected to its lower end is a device comprising an enlarged socket 3, interiorly threaded, adapting it to be screwed onto the valve 1 and having a transverse opening 4 communicating with the interior of the socket 3. At each side of the opening 4 flattened faces 5 are provided, affording means to screw and unscrew the socket 3 in place. Downwardly extending from the socket 3 is a threaded shank 6, preferably made as an integral part and carrying at its lower end a tap 7 of reduced diameter. This construction provides a shoulder joining the shank and tap, against which a jam-nut 8 in threaded engagement with the tap abuts. Before the nut 8 is screwed to position a sleeve 9, formed with a nut 10 at its upper end, is threaded onto the shank 6. This sleeve, as shown, is thickened at its lower end and provided with a series of longitudinal grooves 11, dividing it into a plurality of extending jaws 12, said jaws being of such proportions as to grasp the cage of the standing valve, and thus compelling the sleeve to remain stationary while the shank 6 is being screwed down through it, thus causing the tap to enter the standing valve.

The object of the sleeve is to extend over the tap and keep the threads thereon and also in the upper end of the standing valve from being damaged by coming in contact, as in case the rods should break and precipitate the valves together. It is also sometimes necessary to strike the valves together, as when the balls confined in the cages become stuck or unseated and the pump refuses to work the sleeve will in this instance fully protect the tap and also the threads in the upper end of the standing valve.

In placing the valves in the barrel of the pump the standing valve is dropped into the well-tubing and acquires sufficient momentum to securely drive it into its seat. The working or upper valve after having the sleeve screwed down on the shank until in contact with the jam-nut and covering the tap is connected by the usual rods at its upper end and lowered thereby into the well until in operative position, when the pump is ready for use. When it is for any reason desirable to remove the lower or standing valve, the working valve is lowered until the sleeve is seated thereon, with the jaws engaging at the sides between the bars of the cage. By now turning the rods in the proper direction the sleeve is screwed upwardly on the shank, which, in effect, projects the tap and threads it into the end of the standing valve. Both valves can now be drawn from the well by the rods, thus materially saving in time and labor.

It is obvious that various immaterial changes may be made in the construction hereinbefore described without departing from the spirit of my invention, and I consider that I am entitled to such modifications as fall within the scope of the annexed claims.

Having thus described my invention, I claim as new and desire to secure by Letters Patent—

1. The combination of an upper and lower valve, a threaded shank fixed to the lower end of the upper valve and forming a permanent part thereof, a sleeve in threaded engagement with the shank, jaws carried by the sleeve, and threaded means coacting with the jaws to connect the valves together.

2. The combination of an upper and lower valve, a threaded shank fixed to the lower end of the upper valve and forming a permanent part thereof, a tap extending from the lower end of the shank, a sleeve in threaded engagement with the shank, jaws carried by the sleeve coacting with the tap to connect the two valves together, and means for preventing the accidental removal of the sleeve from the shank.

3. The combination of a threaded shank, means for securing the shank to a valve, a tap projecting from the end of the shank, and a sleeve threaded to the shank having jaws to engage a second valve whereby the tap may be screwed therein for the purpose described.

In testimony whereof I have signed my name to this specification in the presence of two subscribing witnesses.

CLARENCE DELBERT BALLARD.

Witnesses:
  GEORGE BECKER,
  MAUDE BECKER.